US012631528B2

(12) United States Patent
Shirai et al.

(10) Patent No.: US 12,631,528 B2
(45) Date of Patent: May 19, 2026

(54) MICROPARTICLE FILLING METHOD AND MICROPARTICLE FILLING DEVICE

(71) Applicant: Hitachi High-Tech Corporation, Tokyo (JP)

(72) Inventors: Masataka Shirai, Tokyo (JP); Tomoyuki Sakai, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 896 days.

(21) Appl. No.: 17/802,925

(22) PCT Filed: Mar. 9, 2020

(86) PCT No.: PCT/JP2020/010031
§ 371 (c)(1),
(2) Date: Aug. 26, 2022

(87) PCT Pub. No.: WO2021/181467
PCT Pub. Date: Jun. 16, 2021

(65) Prior Publication Data
US 2023/0288301 A1    Sep. 14, 2023

(51) Int. Cl.
    *G01N 1/34*    (2006.01)
    *B01L 3/00*    (2006.01)
(52) U.S. Cl.
    CPC .......... *G01N 1/34* (2013.01); *B01L 3/502761* (2013.01); *B01L 2200/0642* (2013.01);
    (Continued)
(58) Field of Classification Search
    CPC ....... B01L 3/502761; B01L 2400/0654; B01L 2300/0654; B01L 2200/0652; B01L 2200/0642
    See application file for complete search history.

(56) References Cited

U.S. PATENT DOCUMENTS 8,293,524 B2 * 10/2012 Ionescu-Zanetti ..........................
                                    B01L 3/502738
                                         435/395
9,146,221 B2 *  9/2015 Guia ..................... C23C 16/452
                    (Continued)

FOREIGN PATENT DOCUMENTS

JP        2013193988      *  9/2013  ............. C07K 17/02
JP        5415560 B2      2/2014
                    (Continued)

OTHER PUBLICATIONS

Tang, F. et al. "mRNA-Seq whole-transcriptome analysis of a single cell," Nature Methods, 6, 377-382, 2009 (8 pages).
(Continued)

*Primary Examiner* — Timothy L Maust
(74) *Attorney, Agent, or Firm* — PROCOPIO, CORY, HARGREAVES & SAVITCH LLP

(57) ABSTRACT

A microparticle filling method of the present disclosure is a method of filling at least one or more containers with microparticles, including: sucking a suspension of the microparticles into a nozzle; concentrating the microparticles in the suspension to form a high-concentration suspension having a predetermined microparticle concentration at a tip of the nozzle; bringing the high-concentration suspension in contact with an inner wall of the container; and separating the nozzle from the container after the contact to fill the container with the high-concentration suspension.

12 Claims, 9 Drawing Sheets

Specification includes a Sequence Listing.

(52) U.S. Cl.
CPC .................. *B01L 2200/0652* (2013.01); *B01L 2300/0654* (2013.01); *B01L 2400/022* (2013.01)

(56) References Cited

U.S. PATENT DOCUMENTS

| | | | | |
|---|---|---|---|---|
| 11,446,651 | B2 * | 9/2022 | Tourniaire | G01N 1/2813 |
| 2006/0063271 | A1 * | 3/2006 | Putnam | B01L 3/5085 436/174 |
| 2012/0245053 | A1 | 9/2012 | Shirai et al. | |
| 2015/0167063 | A1 | 6/2015 | Shirai et al. | |
| 2018/0304262 | A1 | 10/2018 | Shirai et al. | |

FOREIGN PATENT DOCUMENTS

| | | | | |
|---|---|---|---|---|
| JP | | 5997278 B2 | 9/2016 | |
| JP | | 6307179 B2 | 4/2018 | |
| WO | WO-2010022391 A2 * | | 2/2010 | ............ C12M 41/38 |

OTHER PUBLICATIONS

Shalek, Alex K., et al., "Single-cell transcriptomics reveals bimodality in expression and splicing in immune cells," Nature, 498, 7453, p. 236-240, 2013 (5 pages).
Klein, A., et al. "Droplet Barcoding for Single-Cell Transcriptomics Applied to Embryonic Stem Cells," Cell, 161, 5, p. 1187-1201, 2015 (16 pages).
Fan, H., et al. "Combinatorial labeling of single cells for gene expression cytometry," Science, 347, 6222, p. 1258367, 2015 (9 pages).
Shirai, Masataka et al. "Vertical flow array chips reliably identify cell types from single-cell mRNA sequencing experiments" Scientific Reports, 6, 36014, DOI:10.1038/srep36014 (2016) (14 pages).

* cited by examiner (i) INITIAL STATE    (ii) SEDIMENTATION    (iii) CONTACT    (iv) PULLING UP    (v) FINAL STATE (a)                                        (b)

(a)

(b)

(ii-1)　　　　(ii-2)　　　　(ii-3)

PULLING-UP SPEED OF NOZZLE (μm/sec)

MICROPARTICLE FILLING METHOD AND MICROPARTICLE FILLING DEVICE

TECHNICAL FIELD

The present disclosure relates to a microparticle filling method and a microparticle filling device.

BACKGROUND ART

In general, single cell analysis is one of analysis methods in life science, and is a technique of analyzing and quantifying biological molecules for each single cell. In particular, the single cell analysis is a method of determining nucleic acid sequences of DNA and RNA (particularly mRNA) for each single cell and measuring the number of molecules, using a DNA sequencer.

As specific methods of the single cell analysis, there are known a method of using tubes (plastic containers for reaction of about 0.2 mL to 2 mL) or a titer plate (in which resin reaction containers are integrated in a plate shape by a prescribed number such as 96 or 384) (NPL 1), a method of using a micro flow channel (NPL 2), a method of using an emulsion (NPL 3), a method of using a microwell (NPL 4), a method of using a through microwell (NPL 5), and the like.

In any of the methods, a large number of cells to be analyzed are separated for each single cell, and a cell-intrinsic DNA nucleic acid sequence (hereinafter referred to as a "barcode") is introduced into a nucleic acid extracted from each cell. Thereafter, nucleic acid samples obtained from these multiple cells are put together, DNA sequencing is performed, and DNA sequence information is separated for each piece of barcode sequence information from the obtained sequence data, whereby single cell analysis data can be obtained.

In particular, in the methods described in NPL 3 to 5, it is possible to prepare samples for the DNA sequencer from the large number of cells with a small number of reagents and obtain the sequence data by introducing the barcode after cell isolation and before nucleic acid amplification.

In the single cell analysis method described in NPL 5, the number of microparticles used for analysis of one cell is larger than that in the methods described in NPLs 3 and 4 (one microparticle in NPLs 3 and 4), and the number of nucleic acid capturing DNA probes used for the analysis of one cell can be increased to about 100 times or more. Further, since a cell disruption solution passes through a porous structure having a large number of microparticles, a nucleic acid from a single cell can be captured on the surface of the microparticle in a short time with high efficiency.

In order to use a large number of microparticles for the analysis of one cell in this manner, it is required to fill a micro reaction vessel with the large number of microparticles.

In NPL 5, the micro reaction vessel is filled with the microparticles by dispensing a microparticle suspension into the micro reaction vessel and discharging excess moisture through a through-hole, using the presence of the through-hole in a bottom surface of the micro reaction vessel. Further, a diameter of the micro reaction vessel is as small as 50 to 100 μm, and thus, an inkjet device is used.

Besides such a method, the microparticles can also be dispensed into the micro reaction vessel using a glass pipette.

CITATION LIST

Patent Literature

PTL 1: Japanese Patent No. 6307179
PTL 2: Japanese Patent No. 5415560
PTL 3: Japanese Patent No. 5997278

Non-Patent Literature

NPL 1: F. Tang, C. Barhacioru, Y. Wang, C. Nordman, C. Lee, N. Ku, K. Wang, J. Bodeau, B. B. Tuch, A. Siddiqui, K. Lao, M. A. Surani, "mRNA-Seq whole-transcriptome analysis of a single cell," Nature Methods, 6, 377-82, 2009.

NPL 2: A. K. Shalek, R. Satija, K. Adiconis, R. S. Gertner, J. T. Gaublomme, R. Raychowdhury, S. Schwartz, N. Yosef, C. Malboeuf, D. Lu, C. J. Trombetta, D. Gennert, A. Gnirke, A. Goren, N. Hacohen, J. Z. Levin, H. Park, A. Regev, "Single-cell transcriptomics reveals bimodality in expression and splicing in immune cells," Nature, 498, 7453, p. 236-240, 2013.

NPL 3: A. Klein, L. Mazutis, I. Akartuna, N. Tallapragada, A. Veres, V. Li, L Peshkin, D. Weitz, M. Kirschner, "Droplet barcoding for single-cell transcriptomics applied to embryonic stem cells," Cell, 161, 5, p. 1187-1201, 2015.

NPL 4: H. Fan, G. Pu, S. Fodor, "Expression profiling. Combinatorial labeling of single cells for gene expression cytometry," Science, 347, 6222, p. 1258367, 2015.

NPL 5: Masataka Shirai, Koji Arikawa, Kiyomi Taniguchi, Maiko Tanabe, Tomoyuki Sakai, "Vertical Flow Array Chip reliably identify cell types from single-cell mRNA sequencing experiments" Scientific Reports, 6, 36014 DCI: 10.1038/srep36014 (2016)

SUMMARY OF INVENTION

Technical Problem

However, there are the following problems in the above-described method of filling the micro reaction vessel (container) with the microparticles using the inkjet device or the glass pipette.

First, it is necessary to dispense a solution in which the microparticles are suspended into the micro reaction vessel, and then discharge the excess solution from the micro reaction vessel, in order to fill the micro reaction vessel with the microparticles. At this time, it is required to prevent the microparticles from flowing out using a film having a mesh finer than the microparticle in order to leave the microparticles and discharge only the solution from the micro reaction vessel. However, when the diameter of the microparticle is as small as several μm or less, a size of an opening of the mesh needs to be smaller than the diameter of the microparticle. It is extremely difficult to produce the mesh film having strength and a small opening, and, when an available film having a mesh of such a size is used, a thickness of the film is on the order of mm in order to maintain strength. According this, it is not possible to suction the solution quickly due to a large pressure loss. Furthermore, it is necessary to use a film having a mesh with higher strength in order to quickly remove the solution by applying a high pressure, and thus, it is not possible to achieve both maintenance of the strength of the film and improvement of the suction speed of the solution.

Second, it is necessary to stabilize the microparticle density of the microparticle suspension and to control the number of particles by the amount or the solution in order to control the number of microparticles after filling. However, when the specific gravity of the microparticles is higher than that of a solvent, not only the microparticle density changes due to settling of the microparticles, but also the settling speed changes depending on the degree of micro aggregation of the microparticles, so that it is difficult to maintain the stable microparticle density.

Furthermore, when the microparticle suspension is dispensed into the micro reaction vessel using the inkjet device, physical characteristics of the solution are not constant unless the microparticle density in a discharge nozzle is stable and constant in order to stably discharge droplets, and thus, not only a discharge amount and discharge direction are not stable, but also the discharge itself stops frequently. When the discharge stops, it is necessary to prepare a microparticle suspension again and refills an in yet head with the microparticle suspension. Therefore, time for filling a large number of the micro reaction vessels with microparticles becomes longer by replacement work.

Although the above problem solved if the microparticles can be concentrated to a concentration close to the maximum packing density in advance, and then the microparticles can be separated and charged into the micro reaction vessels, it is technically difficult to collect a certain amount of microparticles itself from microparticle settlings concentrated to a high concentration.

Therefore, the present disclosure provides a technique for stably filling a container with microparticles in a short time.

Solution to Problem

In order to solve the above problems, a microparticle filling method according to the present disclosure is a method of filling at least one or more containers with microparticles, including: sucking a suspension of the microparticles into a nozzle; concentrating the microparticles in the suspension to form a high-concentration suspension having a predetermined microparticle concentration at a tip of the nozzle; bringing the high-concentration suspension in contact with an inner wall of the container; and separating the nozzle from the container after the contact to fill the container with the high-concentration suspension.

Another characteristic relating to the present disclosure will become apparent from the description of the present specification and the accompanying drawings. Further, aspects of the present disclosure are achieved and realized by elements and combinations of various elements, and the following detailed description and aspects of the appended claims.

The description in the present specification is merely illustrative and is not intended to limit the scope of the claims or the application of the present disclosure by no means.

Advantageous Effects of Invention

According to the technique of the present disclosure, it is possible to stably fill the container with the microparticles in a short time.

Other problems, configurations, and advantages which have not been described above become apparent from embodiments to be described hereinafter.

DESCRIPTION OF EMBODIMENTS

First, definitions of terms used in each embodiment of the present disclosure will be described.

"Micro reaction vessel": A recessed container formed on a planar substrate. Typically, a diameter thereof is several μm to several hundred μm, and particularly, the diameter is several tens of μm. The micro reaction vessel also includes a micro reaction vessel described in NPL 5 in which a through-hole for capturing a cell is formed on a bottom surface.

"Nozzle": A nozzle having a hollow structure in which a solution and microparticles can move, and having a tip that is insertable into the micro reaction vessel.

"Buffer": A solution in which microparticles are suspended. The pH or salt concentration thereof may be controlled to maintain the suspended state of the microparticles. Further, a surfactant may be mixed as necessary in order to control wettability (a contact angle) with an outer wall of the nozzle and an inner wall of the micro reaction vessel.

"Microparticle": A particle having a larger specific gravity larger than that of a solution and a diameter of several hundred nm to several hundred μm, or a particle having magnetism, electric charge, or dielectric characteristics and a diameter of several nm to several hundred μm.

"Contact": Contact of a solution component (buffer) of a microparticle suspension sucked into the nozzle tip with the inner wall (the bottom surface and a sidewall surface) of the micro reaction vessel. In particular, a state in which a contact angle can be defined between the solution and the inner wall.

"Concentrating": Increasing a microparticle concentration of the microparticle suspension (number of microparticles per unit volume (number density)) to reach a microparticle concentration at which the density is 50% or more of the maximum packing density of the microparticles.

"Filling": Supply of a required number of microparticles (required microparticle concentration) to the inside of the micro reaction vessel.

"Settling": An increase in microparticle concentration in some regions, particularly at the nozzle tip, deviating from a microparticle concentration of the microparticle suspension stored in a storage container.

"Determination": Determining whether or not a region (high-concentration suspension) in which a microparticle concentration has increased is formed at the nozzle tip and the microparticle concentration and the volume of the region nave reached such levels that contain the number of microparticles accounting for 50% or more of the volume of the micro reaction vessel.

"High concentration": A state in which a microparticle concentration of microparticles required for filling has been reached. The high concentration indicates a microparticle concentration at which the density is 50% or more of the maximum packing density of microparticles.

First Embodiment

<Microparticle Filling Method>

Figure 1:
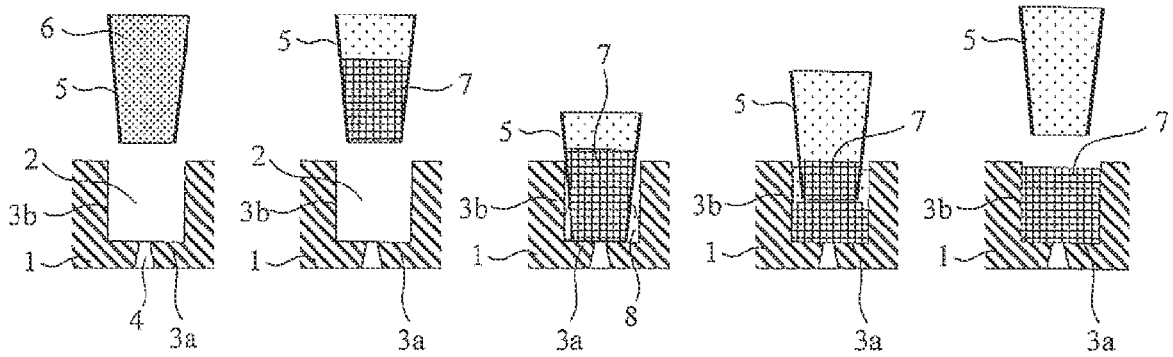
FIG. 1 is a schematic cross-sectional view for describing a microparticle filling method according to a first embodiment.

FIG. 1 is a schematic cross-sectional view for describing a microparticle filling method according to a first embodiment. As illustrated in FIG. 1, the method includes the following steps (i) to (v).

(i) Initial State

A planar substrate 1 on which a micro reaction vessel 2 (container) as recess is formed is prepared, a suspension 6 obtained by suspending microparticles in a solution is sucked into a nozzle 5 for dispensing, and the nozzle 5 is positioned immediately above the micro reaction vessel 2.

The planar substrate 1 is, for example, a chip (titer plate) for single cell analysis. A plurality of the micro reaction vessels 2 may be formed on the planar substrate 1. A through-hole 4 extending from a bottom surface 3a of the micro reaction vessel 2 to a bottom surface of the planar substrate 1 is formed in the micro reaction vessel 2. The nozzle 5 has a shape tapered toward its tip, but may have a shape having a constant outer diameter as long as the nozzle 5 can be inserted into the micro reaction vessel 2 until the tip comes into contact with the bottom surface 3a of the micro reaction vessel 2. The outer diameter of the tip of the nozzle 5 can be set to, for example, 80% to 90% of a diameter of the bottom surface 3a of the micro reaction vessel 2, but is not limited thereto.

(ii) Concentrating (Settling)

The resultant is left in the initial state for a predetermined time, and the microparticles in the suspension 6 are settled at the tip of the nozzle 5 by gravity and concentrated to obtain a high-concentration suspension 7 having a predetermined volume and a predetermined concentration. Alternatively, when the microparticles are magnetic microparticles, the microparticles are moved to the tip of the nozzle 5 and concentrated by applying a magnetic force from the outside to obtain the high-concentration suspension 7. The predetermined volume is set to, for example, a value such that the number of microparticles account for 50% or more of the volume of the micro reaction vessel 2 is contained when the micro reaction vessel 2 is filled with the high-concentration suspension. As described above, the predetermined concentration (high concentration) is a microparticle concentration au which a density 50% or more of the maximum packing density of the microparticles.

From a time point when the state of the above-described step (i) is constructed, for example, an image of the nozzle 5 is captured by an external camera, and the volume of the high-concentration suspension 7 in the nozzle 5 is estimated by observing temporal and spatial changes of the microparticles in the nozzle 5. At this time, it can be determined that the predetermined volume of the high-concentration suspension 7 has been obtained when a liquid level height of the high-concentration suspension 7 in the nozzle 5 reaches a predetermined value.

Alternatively, it is also possible to determine whether or not the predetermined volume of the high-concentration suspension 7 has been obtained by irradiating the tip of the nozzle 5 with light and then measuring a light amount or distribution of light such as scattered light, absorbed light, or transmitted light. In this case, it is necessary to appropriately control a spot size and a position in the vicinity of the nozzle 5 of the light to be emitted. Further, a position at a predetermined height of the nozzle 5 may be irradiated with light to determine that the predetermined volume of the high-concentration suspension 7 has been obtained based on scattered light, absorbed light, transmitted light, or the like at the position.

(iii) Contact

When the predetermined volume of the high-concentration suspension 7 has been obtained in step (ii), the nozzle 5 is lowered to bring a solution 8 into contact with an inner wall 3 (the bottom surface 3a or a sidewall surface 3b) of the micro reaction vessel 2 by surface tension of the solution 8 at the tip of the nozzle 5. According to this, the solution 8 wets and spreads in the micro reaction vessel 2, the solution 8 permeates up to at least a part of the sidewall surface 1b of the micro reaction vessel 2, thereby becoming a state in which the solution 8 comes into contact with the bottom surface 3a and the sidewall surface 3b of the micro reaction vessel 2.

(iv) Pulling up

When the solution 8 comes into contact with the bottom surface 3a and the sidewall surface 3b of the micro reaction vessel 2 in step (iii), the nozzle 5 is pulled up at a predetermined speed to fill the micro reaction vessel 2 with the high-concentration suspension 7. The principle of such filling will be described later.

(v) Final State

Defined as a final state is a state in which the micro reaction vessel 2 is filled with the high-concentration suspension 7.

<Principle>

Figure 2:
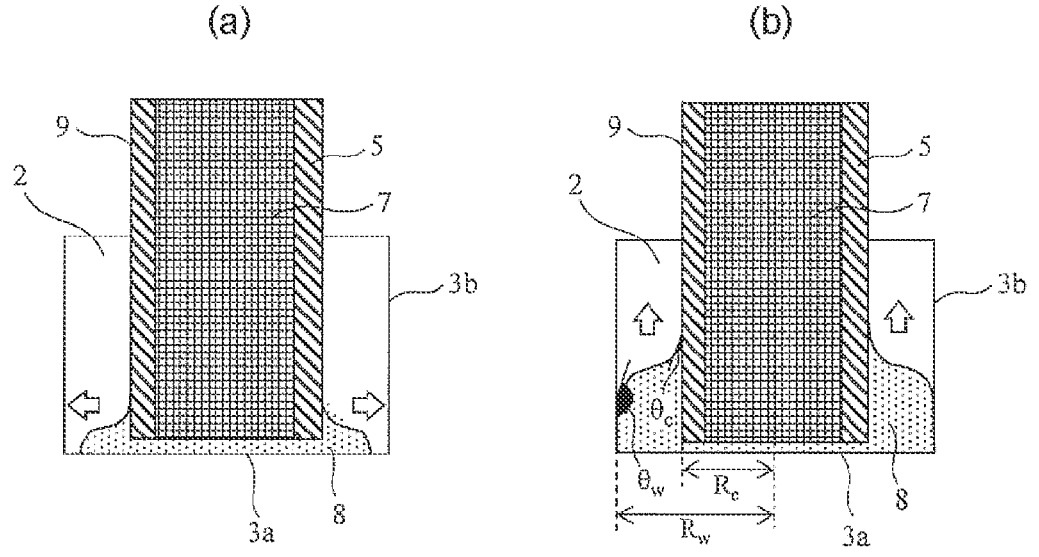
FIG. 2 is a schematic cross-sectional view for describing a principle of filling a micro reaction vessel with microparticles.

FIG. 2 is a schematic cross-sectional view for describing the principle of the microparticle filling method according to the present embodiment, and illustrates the tip of the nozzle 5 and an internal space of the micro reaction vessel 2 is an enlarged manner. FIG. 2(a) illustrates a state immediately after the solution 8 in the nozzle 5 comes into contact with the bottom surface 3a of the micro reaction vessel 2. As illustrated in FIG. 2(a), when the nozzle 5 is lowered in step (iii) and a part of a lower end of the nozzle 5 comes into contact with the bottom surface 3a (inner wall) of the micro reaction vessel 2, the solution 8 in the high-concentration suspension 7 wets and spreads on (comes into contact with) the bottom surface 3a of the micro reaction vessel 2.

FIG. 2(b) illustrates a state in which the solution 8 also comes into contact with the sidewall surface 3b of the micro reaction vessel 2. As illustrated in FIG. 2(b), the solution 8 leaches out until coming into contact with at least a part of the sidewall surface 3b.

Here, it is assumed that a radius of the bottom surface 3a of the micro reaction vessel 2 is Rw, a radius of an outer wall 9 at the tip of the nozzle 5 is Rc, a contact angle of the solution 8 with respect to the inner wall of the micro reaction vessel 2 is θw, and a contact angle of the solution 8 with respect to the outer wall 9 of the nozzle 5 is θc.

When a suction pressure (ΔP) represented by the following Formula (1) is positive, the high-concentration suspension 7 of microparticles can be taken out from the nozzle 5. Therefore, the micro reaction vessel 2 can be filled with the high-concentration suspension 7 of the microparticles by pulling up the nozzle 5 at a predetermined speed while maintaining the state of ΔP>0 in step (iv). A pulling-up speed of the nozzle 5 can be set to be constant within a range in which ΔP>0 can be maintained, or the pulling-up may be performed while being accelerated or decelerated.

[Formula 1]

$$\Delta P = \frac{2(R_w \cos \theta_W + R_C \cos \theta_C)}{R_W^2 - R_C^2} \qquad (1)$$

It is unnecessary to additionally discharge the solution from the high-concentration suspension 7 charged in the micro reaction vessel 2. Since the microparticle concentration of the high-concentration suspension 7 is 50% or more of the maximum packing density as described above, microparticles of at least 50% or more of the volume of the micro reaction vessel 2 are charged by making the volume of the high-concentration suspension 7 the same as the volume of the micro reaction vessel 2. If the microparticle concentration and volume of the high-concentration suspension 7 are set to appropriate conditions, 80% or more of the volume of the micro reaction vessel 2 can be occupied by microparticles in a dry state.

The volume of the high-concentration suspension formed in the nozzle 5 can also be set to be larger than the volume of the micro reaction vessel 2. Assuming that the micro reaction vessel 2 is formed with no error with an opening angle of 90° and no substance adhering on the inner wall (in a shape in FIG. 2), the contact angle θw becomes less than 90° if the solution 8 that has leached out reaches an upper end of the micro reaction vessel 2 at the time of pulling up the nozzle 5 in step (v). When this contact angle θw is put into Formula (1), ΔP<0 is found, so that the discharge of the high-concentration suspension 7 from the nozzle 5 is theoretically stopped. Therefore, even if the volume of the high-concentration suspension 7 is larger than the volume of the micro reaction vessel 2, the discharge stops at the upper end of the micro reaction vessel 2, and thus, it is considered that the high-concentration suspension 7 does not overflow from the micro reaction vessel 2.

The micro reaction vessel 2 illustrated in FIG. 1 has the through-hole 4 for capturing cells necessary for the single cell analysis chip, but the through-hole 4 is not essential for the above-described principle of the microparticle filling. In practice, a container that does not have the through-hole can be filled with microparticles according to the above-described principle. That is, the container filled with the microparticles by the technology of the present embodiment is not limited to the micro reaction vessel 2 of the single cell analysis chip, and may be any container into which the nozzle 5 can be inserted. A cross-sectional shape of the container filled with the microparticles is not limited to the rectangle as illustrated in FIGS. 1 and 2, and other shapes such as a trapezoid in which the bottom is smaller than an opening can be adopted.

Although the method for filling the single micro reaction vessel 2 with the microparticles has been described above, the above-described operation may be repeated in a case of filling the plurality of micro reaction vessels 2 with the microparticles. Specifically, after filling of a first micro reaction vessel completed according to the above-described steps (i) to (v), the nozzle 5 may be moved immediately above a second micro reaction vessel to be in the state with respect to the second micro reaction vessel, and steps for the microparticle filling may be repeated.

The similar operation is also performed in a case of filling different micro reaction vessels 2 with a plurality of kinds of microparticles, respectively. For example, an example will be described in which preset micro reaction vessels are individually filled with a plurality of types of microparticles to which DNA probes having different sequences are immobilized, in order to produce chips for single cell analysis described in NPL 5 and PTLs 1 to 3.

First, the microparticle suspension is sucked using a capillary phenomenon by preparing storage containers (storage tubes) for suspensions in which the various microparticles are suspended respectively, and immerging an empty nozzle 5 in the storage container storing the desired suspension. Alternatively, the microparticle suspension is sucked by a suction operation by installing a syringe pump or the like at a tip of the empty nozzle 5 on a side opposite to a tip at which the microparticle suspension is dispensed.

Next, the nozzle 5 is moved immediately above the predetermined micro reaction vessel 2 so as to be in the initial state of step (i), and then steps (ii) to (v) are performed.

Next, the nozzle 5 is moved to a waste liquid container (waste liquid tube). The microparticle suspension remaining in the nozzle 5 is discarded to the waste liquid container by operating, for example, a syringe pump.

Next, in order to clean the nozzle 5, the nozzle 5 is immersed in a plurality of kinds of cleaning liquids respectively stored in a plurality of storage containers. Suction and disposal of the cleaning liquid are repeated to completely clean and remove microparticles adhering to the nozzle 5. As the cleaning liquid, for example, possible to use pure water such as ion-exchange water filtered through a filter and alcohol such as ethanol.

The above operations are repeated in order to fill a micro reaction vessel at the next position with the next type of microparticles.

<Microparticle Filling Device>

Figure 3:
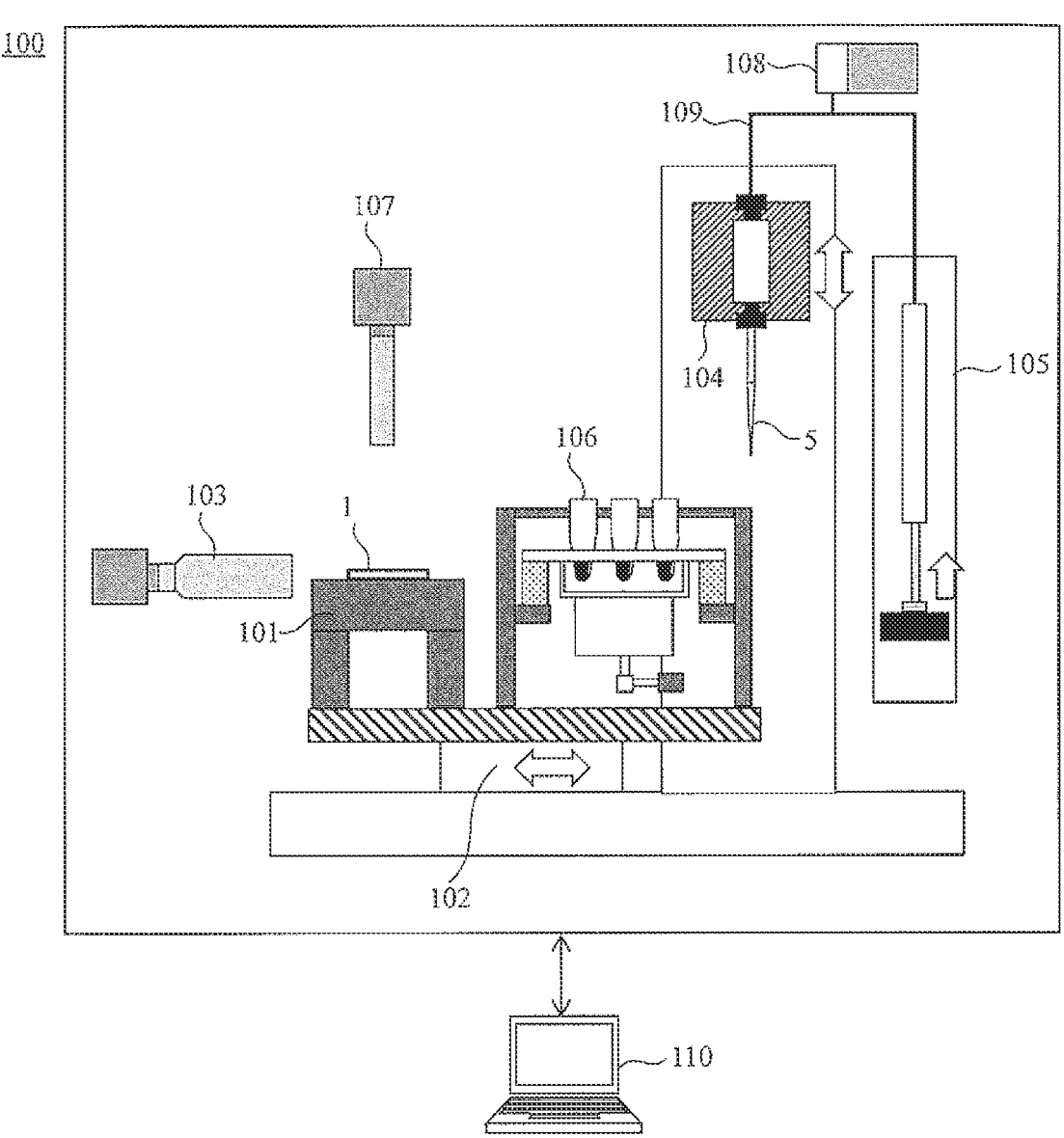
FIG. 3 is a schematic view illustrating a microparticle filling device according to the first embodiment.

FIG. 3 is a schematic view illustrating a microparticle filling device 100 according to the first embodiment. The microparticle filling device automatically performs the above-described microparticle filling method. As illustrated in FIG. 3, the microparticle filling device 100 includes: the nozzle 5, a stage 101, a drive system 102, an optical system 103, a sensor system 104, a dispensing system 105, a plurality of storage containers 106, a camera system 107, a valve 108, a tube 109, and a control system 110.

The stage 101 fixes and positions the planar substrate 1 having the micro reaction vessel.

The drive system 102 moves the nozzle 5 by a set distance in three axial directions relative to the planar substrate 1. For example, the drive system 102 moves the nozzle 5 in the vertical direction and moves the stage 101 in the horizontal direction. The drive system 102 may move only the stage 101 in three axial directions.

The optical system 103 observes a concentrating status of a microparticle suspension in the nozzle 5 that has been moved directly above the micro reaction vessel. The optical system 103 may be a camera that captures an image of the tip of the nozzle 5, or may be an optical system that irradiates the tip of the nozzle 5 with light to analyze scattered light, absorbed light, or transmitted light.

The sensor system 104 senses contact between the nozzle 5 and the micro reaction vessel. The sensor system 104 includes, for example, a pressure sensor, and senses, with the pressure sensor, an upward force generated due to the contact between the nozzle 5 and the micro reaction vessel to determine the contact between the nozzle 5 and the micro reaction vessel. Alternatively, the sensor system 104 may be configured to sense the contact by an optical means such as a camera.

The dispensing system 105 includes, for example, a syringe pump, and controls suction and discharge of a liquid with respect to the nozzle 5. In particular, the dispensing system 105 controls suction of a microparticle suspension into the nozzle 5. The nozzle 5 is connected to the dispensing system 105 by the tube 109 (e.g. PEEK tube).

The plurality of storage containers 106 include a storage container in which a microparticle suspension is stored, a storage container in which a cleaning liquid is stored, and a waste liquid container in which a waste liquid is collected.

The camera system 107 is used to observe positions of the planar substrate 1 and the nozzle 5 and to align the tip of the nozzle 5 immediately above the micro reaction vessel of the planar substrate 1.

The valve 108 can be provided as one of components of the dispensing system 105 and is used for atmospheric pressure relief.

The control system 110 controls operations of the drive system 102, the optical system 103, the sensor system 104, the dispensing system 105, and the camera system 107. Further, the control system 110 receives detection signals of the optical system 103, the sensor system 104, and the camera system 107, and executes necessary arithmetic processing.

<Operation of Microparticle Filling Device>

Figure 4:
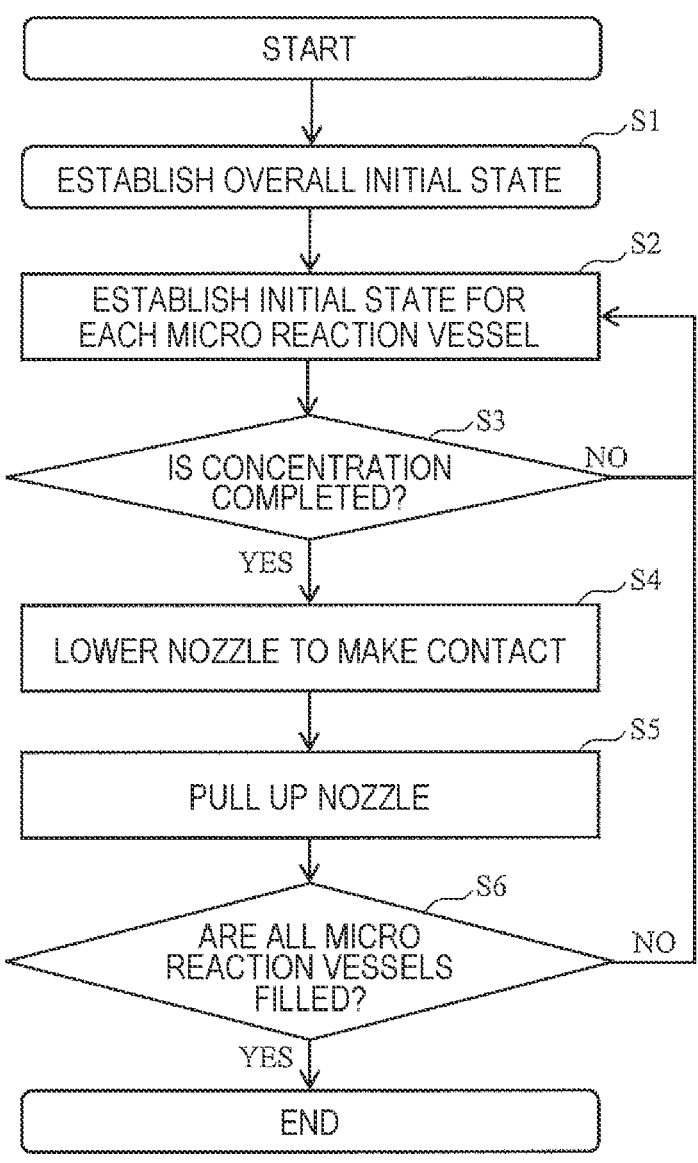
FIG. 4 is a flowchart illustrating an operation of the microparticle filling device.

FIG. 4 is a flowchart illustrating an operation of the microparticle filling device 100.

In step S1, the control system 110 establishes an overall initial state of the microparticle filling device 100. Specifically, first, a user places the planar substrate 1 on the stage 101, and arranges the storage container 106 for a microparticle suspension and the storage container 106 for a cleaning liquid at predetermined positions. Thereafter, when the user, for example, inputs an operation start instruction from an input device of the control system 110, the control system 110 confirms whether the planar substrate 1, the nozzle 5, and the storage container 106 are all located at predetermined initial positions. If any one of these is not located in the initial position, the one is moved to the initial position by the drive system 102.

In step S2, the control system 110 establishes the initial state for each of the micro reaction vessels 2. Specifically, the control system 110 drives the drive system 102 and the dispensing system 105 to cause the nozzle 5 to suck a cleaning liquid and discharge the cleaning liquid to the waste liquid container (not illustrated) to clean the nozzle 5. Thereafter, the control system 110 causes the nozzle 5 to suck a microparticle suspension and moves the microparticle suspension directly above the predetermined micro reaction vessel 2.

In step S3, the control system 110 determines whether microparticles in the microparticle suspension in the nozzle 5 have settled and a predetermined volume of a high-concentration suspension having a predetermined microparticle concentration has been formed. Here, the high-concentration suspension is optically dense, and thus, can be observed by the optical system 103 as a black region as compared with a low-concentration region. The control system 110 calculates a size of the black region based on the contrast of an image received from the optical system 103 and the like, and calculates the concentration and volume of the high-concentration suspension based thereon. It can be determined that the concentration and volume of the high-concentration suspension have reached predetermined values by holding the state of step S2, for example, for 90 to 120 seconds after being established.

In step S4, the control system 110 drives the drive system 102 to lower the nozzle 5 and bring the tip of the nozzle 5 into contact with a bottom surface or the micro reaction vessel. Due to the contact, a solution of the microparticle suspension at the tip of the nozzle 5 wets the bottom surface and a sidewall surface of the micro reaction vessel. In the present disclosure, defined as the contact of the nozzle 5 is wetting of the microparticle suspension on an inner wall of the micro reaction vessel. This is because it is necessary and essential that the solution wets wall surfaces of both the inner wall of the micro reaction vessel and the outer wall of the nozzle 5 to form an appropriate contact angle and that the high-concentration suspension in the nozzle 5 is drawn into the micro reaction vessel. However, practically, the lowering of the nozzle 5 needs to be stopped somewhere, and thus, the sensor system 104 is provided to sense the contact.

An interface of the microparticle suspension enters into between the nozzle 5 and the sidewall surface of the micro reaction vessel and the interface rises, for example, within two seconds after the contact occurring between the nozzle 5 and the micro reaction vessel. The control system 110 maintains the contact state for two seconds for this rise. Here, the reason why the contact state is maintained for two seconds is because, for example, when the micro reaction vessel has a diameter of 75 μm and the tip of the nozzle 5 has an outer diameter of 70 μm (inner diameter of 52.5 μm), it is possible to provide a state in which the solution reliably wets the bottom surface and the sidewall surface of the micro reaction vessel if two seconds elapse after the contact between the nozzle 5 and the micro reaction vessel. It goes without saying that the time for maintaining the contact state can be appropriately changed according to the outer diameter of the nozzle 5 and the diameter of the micro reaction vessel 2.

In step S5, the control system 110 drives the drive system 102 to pull up the nozzle 5 at a speed of, example, about 1 to 10 μm/s. According to this operation, the microparticles in the nozzle 5 are moved to the micro reaction vessel to fill the micro reaction vessel with the microparticles.

In step S6, the control system 110 determines whether the micro reaction vessels 2 are filled with microparticles.

If NO in step S6, the control system 110 drives the drive system 102 and the dispensing system 105 to discard the microparticle suspension remaining in the nozzle 5 to the waste liquid container for filling the next micro reaction vessel 2 with microparticles.

Next, the operation returning to step S2, the control system 110 drives the drive system 102 and the dispensing system 105 to suck and discharge two types of cleaning liquids, and thereby to clean the nozzle 5. Next, the control system 110 drives the drive system 102 and the dispensing system 105 to suck a suspension of microparticles (for example, microparticles in which a cell recognition tag sequence different from the previous time is immobilized) different from the previously charged microparticles into the nozzle 5 and move the suspension to immediately above the micro reaction vessel 2 different from the previous time.

According to this operation, the initial state of the next micro reaction vessel 2 is established. Thereafter, steps S3 to S6 are executed in the same manner as described above.

Similarly, steps S2 to S6 are repeated for the second and subsequent micro reaction vessels 2. The control system 110 ends the operation of the microparticle filling device 100 if YES is determined in step S6.

In order to fill the micro reaction vessel 2 with the microparticles, it is required that the microparticles is concentrated in step S4 (step (ii)) and the microparticle suspension wets and reaches the sidewall surface of the micro reaction vessel 2 in the next step S5 (step (iii)) such that the contact angle between the inner wall of the micro reaction vessel 2 and the solution and the contact angle between the outer wall of the nozzle 5 and the solution satisfy the conditions of Formula (1). In order to satisfy the conditions, a certain condition needs to be satisfied in each of materials for respectively determining the hydrophilicity of the inner wall of the micro reaction vessel 2 and the hydrophilicity of the outer wall of the nozzle 5 and in each of the inner diameter of the micro reaction vessel 2 and the outer diameter of the tip of the nozzle 5.

Here, when a contact angle of water was measured using dimethylpolysiloxane (PDMS) as the material of the planar substrate (chip material) and glass as the material of the nozzle, the contact angle of water with respect to dimethylpolysiloxane was 97.9° on average (maximum 106°), and the contact angle of water with respect to glass was 42.2° on average (maximum 59.0) (n=10 in each case).

When the contact angle has the maximum value, the minimum outer diameter of the nozzle tip required for the suspension to rise was derived from Formula (1) to be 40 μm.

Figure 5:
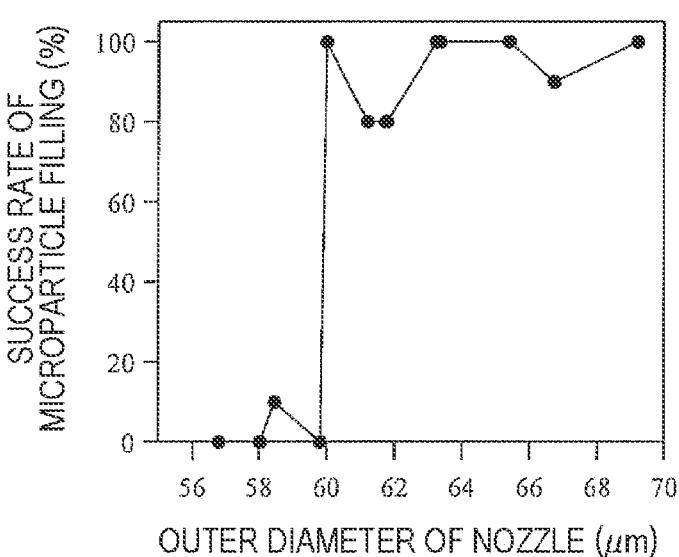
FIG. 5 is a graph illustrating a result of measuring a success rate of microparticle filling with respect to an outer diameter of a nozzle tip.

FIG. 5 is a graph illustrating a result of measuring success rates of microparticle filling with respect to outer diameters of a nozzle tip. In this measurement, a planar substrate of dimethylpolysiloxane was processed using an imprinting technique to form a plurality of micro reaction vessels. A cylindrical shape having a diameter of 75 μm and a height of 70 μm was used as a shape and dimensions of the micro reaction vessel. As illustrated in FIG. 5, when the micro reaction vessel was filled with microparticles by the method of the present embodiment using a plurality of nozzles having different outer diameters of tips, it was found that the success rate of microparticle filling was 80% or more when the outer diameter of the nozzle tip was 60 μm or more.

It is considered that a difference between a theoretical value (40 μm) of the minimum outer diameter of the nozzle tip calculated by calculation using Formula (1) and the measurement result (60 μm or more) in FIG. 5 is caused due to the following reason. First, contact angles vary, and a condition for pulling up the nozzle is determined by putting an average value of the contact angles into Formula (1) of ΔP. A radius of the nozzle is determined as a value corresponding to a condition of this ΔP. Unless a certain or more region (a considerable region of a length of an outer periphery of the nozzle) of the radius of the nozzle satisfies the condition of ΔP, the pulling up is not successful. However, in spite of the fact that the nozzle also has a portion where the radius does not satisfy the condition of ΔP due to a manufacturing error or the like, the nozzle is pulled up such that ΔP>0 is satisfied including this portion. Because of this, it is considered that the measurement result in FIG. 5 is larger than the theoretical value calculated using the maximum value of the contact angle.

In the operation of the microparticle filling device 100 described above, it is assumed that the nozzle 5 having the outer diameter of 70 μm (inner diameter of 52.5 μm) is used. Although the description has been given assuming that the contact time between the nozzle 5 and the micro reaction vessel is two seconds and the pulling-up speed of the nozzle 5 is 1 to 10 μm/s, it goes without saying that these values can be appropriately changed according to the outer diameter of the nozzle 5 and the diameter of the micro reaction vessel 2.

<Technical Effect>

As described above, the microparticle filling method according to the first embodiment includes: sucking a suspension of micro particles into a nozzle; concentrating the microparticles in the suspension to form a high-concentration suspension having a predetermined microparticle concentration at a tip of the nozzle; bringing the high-concentration suspension in contact with an inner wall of a micro reaction vessel; and separating the nozzle from a container after the contact to fill the micro reaction vessel with the high-concentration suspension. Such a method can shorten the time for dispensing the microparticles as compared with a conventional method of dispensing a microparticle suspension to eliminate an excess solution. Further, because the microparticles are concentrated to the predetermined concentration before being charged into the micro reaction vessel (container), a certain amount of the microparticles can be charged with good reproducibility.

Since the principle the filling of the microparticle suspension into the micro reaction vessel is dispensing using the surface tension (contact angle) of the solution with respect to the solid surface, it is possible to accurately dispense a highly viscous and highly concentrated microparticle suspension to the upper end of the micro reaction vessel. Such a dispensing method is different in principle from a method for dispensing a general solution (not containing microparticles).

Second Embodiment

In the first embodiment, the technique of filling the micro reaction vessel formed in the planar substrate with the microparticles has been described. In a second embodiment, it is proposed to apply the above-described technique to filling a micro reaction vessel provided on a chip (substrate) of a single cell analysis device with microparticles.

<Configuration Example of Chip>

Figure 6:
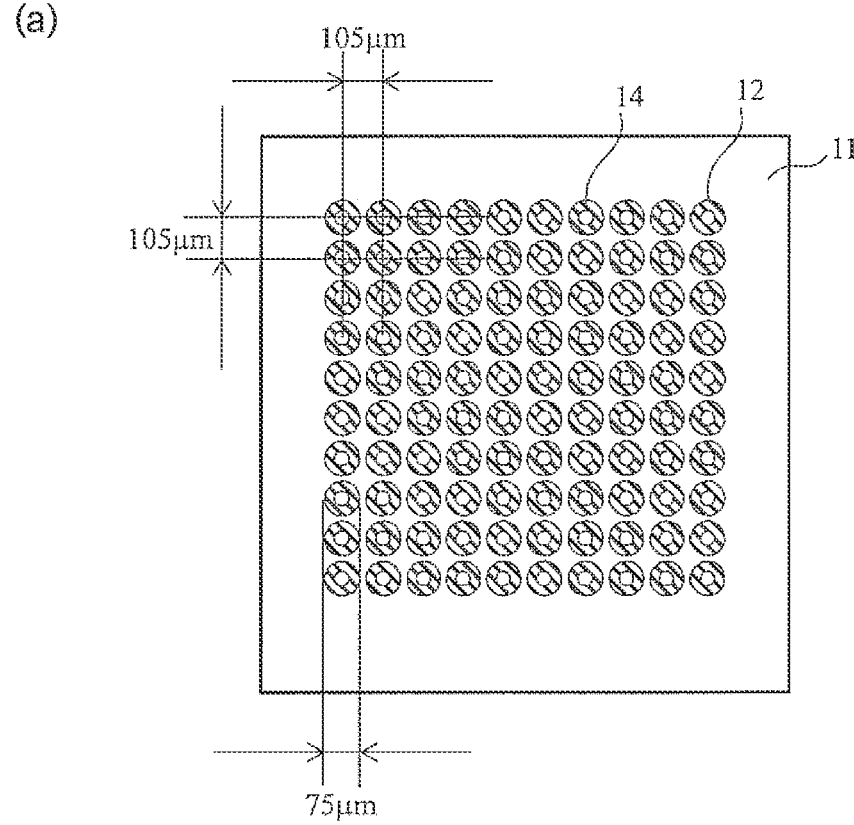
FIG. 6 is a schematic view illustrating a chip for single cell analysis.
Figure 6:
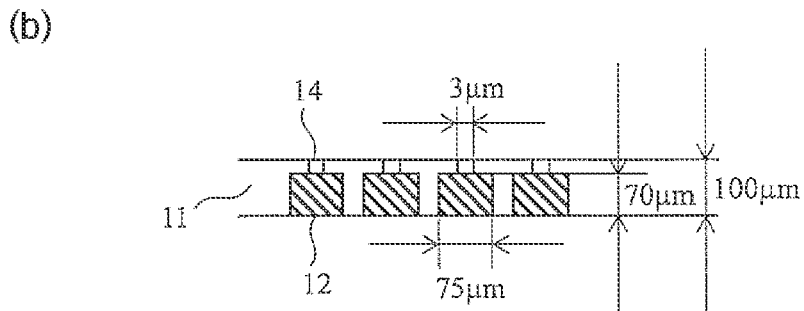

FIG. 6(*a*) is a top view illustrating a chip 11 (substrate) for single cell analysis. FIG. 6(*b*) is a cross-sectional view illustrating a part of a cross section of the chip 11. 10×10 micro reaction vessels 12 are formed at equal intervals on the chip 11. The micro reaction vessel 12 is provided with a through-hole 14 for capturing cells, thereby forming a chip structure capable of cell isolation for single cell analysis. The chip 11 having such a structure can be molded using an imprinting technique with, for example, dimethylpolysiloxane (PDMS) as a material. The through-hole 14 can be perforated by laser processing, but another particle beam processing or molding processing using a mold is also possible.

Various materials can be used as the material of the chip 11, and examples thereof include various resin materials (polycarbonate-based resin, polycycloolefin-based resin, polyolefin-based resin, polypropylene-based resin, polyethylene-based resin, acrylic-based resin, acrylonitrile-based resin, and the like), metal materials, semiconductor materials such as silicon, oxide materials such as quartz and alumina, and amorphous materials such as glass. These materials can also be used in combination of a plurality of materials for processing or for controlling surface wettability.

FIGS. 6(a) and 6(b) illustrate examples of dimensions of the chip 11. In the illustrated example, the micro reaction vessel 12 has a cylindrical shape with a diameter of 75 μm and a height of 70 μm. A distance between centers of adjacent micro reaction vessels 12 is 105 μm. The through-hole 14 has a diameter of 3 μm as the smallest hole diameter, and a length of 30 μm. Note that the above size is just an example of the size suitable for the single cell analysis device, and the size of the micro reaction vessel 12 to be filled with microparticles may be any of several μm to several hundred μm in both diameter and height. Further, the shape of the micro reaction vessel 12 does not need to be cylindrical, and may be a polygonal column such as a quadrangular prism, a tapered shape such as a truncated cone or a quadrangular prism as long as there is an opening that can be filled with microparticles.

In the single cell analysis device, the microparticles charged in the micro reaction vessel 12 of the chip 11 are microparticles configured to perform gene expression analysis in which the amount of mRNA in a single cell is measured for each gene sequence. It is possible to apply to various types of single cell analysis, by changing a molecule to be immobilized to the microparticle according to a purpose of analysis.

In the present embodiment, magnetic microparticles (diameter: 1 μm) in which a large number of streptavidin molecules are immobilized on the surface are used. In order for the use in the single cell analysis, mRNA to be measured is captured on the surface of the microparticles, and DNA probes are immobilized in order to introduce a barcode sequence for cell identification into a nucleic acid sample. Biotin for strong binding to streptavidin is immobilized on a 5' end of the DNA probe.

The sequence of the DNA probes has, in order from the 5' end, a common sequence for PCR, a molecular recognition tag sequence, a cell identification tag sequence (7 base), and a consecutive sequence of T for mRNA capturing at a 3' end. The sequence of the DNA probes is illustrated in SEQ ID No. 1 to 100. The cell identification tag sequence is 100 types of 7-based known sequences. The molecular recognition tag sequence is a 7-based random sequence.

A length and a position of the cell identification tag sequence may be different from those described above. For example, three types of 7-based known sequences may be arranged so as to sandwich 3-based known sequences at two locations, or may be arranged as a random sequence instead of the known sequence. Similarly, a length and an arrangement of the molecular recognition tag sequence also can be changed.

A method for immobilizing the DNA probes on the microparticles is as follows. First, the microparticles and the DNA probes are mixed in 1×B&W buffer (5 mM Tris-HCl (pH 7.5), 0.5 mM EDTA, and 1 M NaCl) and is subjected to a binding reaction at room temperature for about 30 minutes while attention is paid such that the DNA probes having different cell identification tag sequences are not mixed with each other. Thereafter, the suspension cleaned twice with 1×B&W buffer, and then, suspended with buffer having 10 mM iris at pH 8.0 to obtain a microparticle suspension. As the microparticle suspension, 100 types having different cell identification tags sequences are prepared in 100 different storage tubes.

<Filling of Chip with DNA Probe-Immobilized Microparticles>

A method for filling the chip 11 with the microparticles on which the DNA probes are immobilized will be described.

Figure 7:
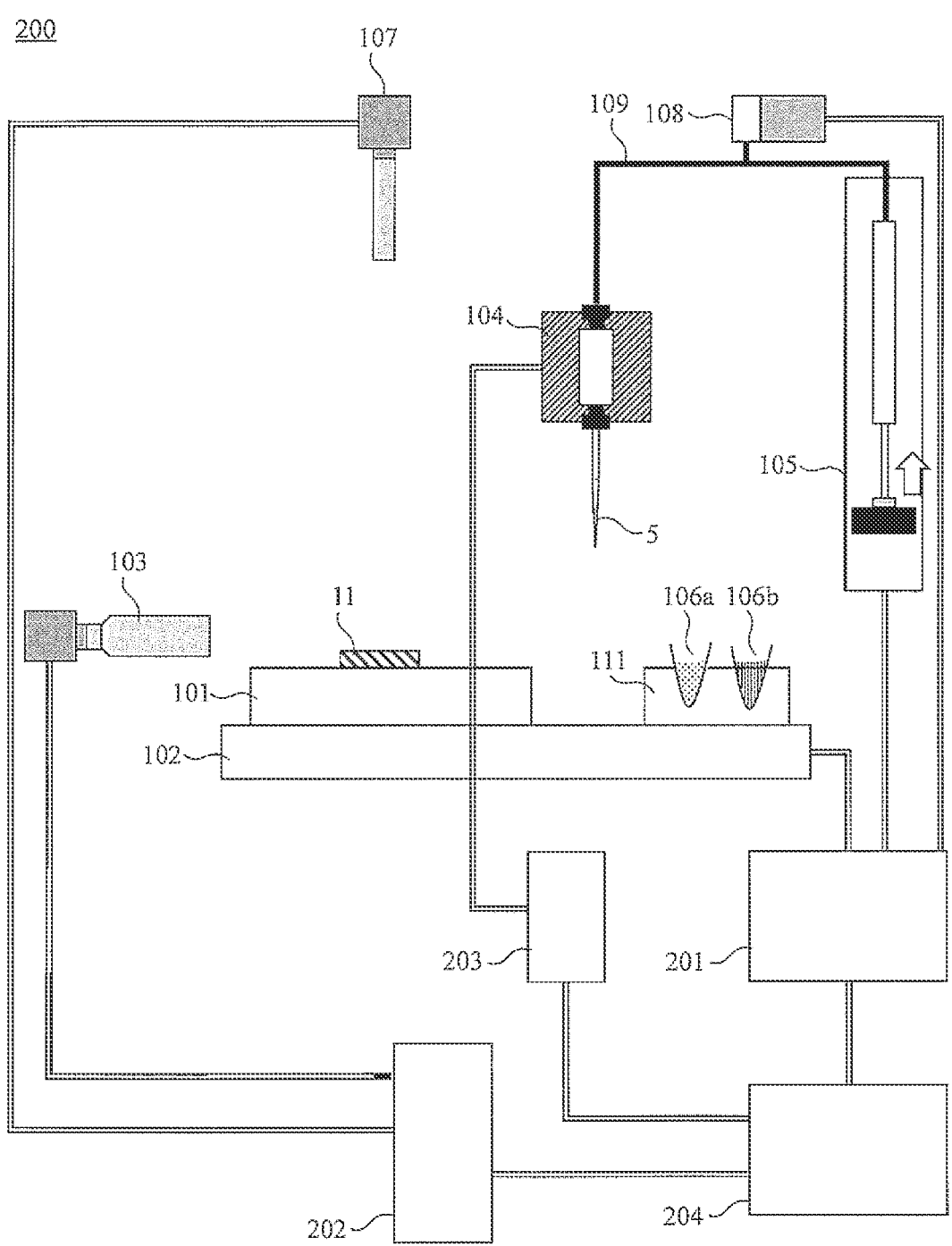
FIG. 7 is a schematic view illustrating a microparticle filling device according to a second embodiment.

FIG. 7 is a schematic view illustrating a microparticle filling device 200 according to the second embodiment. Since a configuration of the microparticle filling device 200 is substantially similar to that of the microparticle filling device 100 (FIG. 3) of the first embodiment, only differences will be described. The microparticle filling device 200 includes a control board 201, an image acquisition board 202, an AD conversion board 203, and a control computer 204 as control devices of the respective components. A double line in FIG. 7 indicates a connection that allows transmission or reception (transfer) of a signal.

The control board 201 controls driving of the drive system 102, the dispensing system 105, and the valve 108. In the present embodiment, the drive system 102 moves, in three axial directions, the stage 101 on which the chip 11 is placed and a stage 111 on which storage containers 106a and 106b are placed.

The image acquisition board 202 controls operations of the optical system 103 and the camera system 107, and receives signals or images acquired by the optical system 103 and the camera system 107.

The AD conversion board 203 converts an analog signal from the sensor system 104 into a digital signal.

The control computer 204 stores a control program of the microparticle filling device 200, and controls the control board. 201, the image acquisition board 202, and the AD conversion board 203 according to the control program.

As the nozzle 5, one produced by extending a glass tube having a diameter of 1 mm to 3 mm to sharpen its tip is used. A puller and microforge are used for processing the glass tube. The nozzle 5 is connected to the dispensing system 105 using the tube 109 such that a microparticle suspension can be sucked to clean the nozzle 5. Instead of using the dispensing system 105, the nozzle 5 may be connected to a syringe, and driving of the syringe may be controlled by the control board 201.

The storage container 106a containing the suspension of microparticles to which the above-described 100 types of different cell identification tags are immobilized is installed on the container stage 111. The container stage 111 may be provided with a rotation motor that vibrates or rotates then storage container 106a, whereby the storage container 106a can be stirred such that the microparticle suspension becomes a uniform solution immediately before the suction by the nozzle 5. Further, for example, as the storage container 106b storing a cleaning liquid, three containers storing filtered ion-exchange water (pure water) and one container storing 100% EtOH are installed on the container stage 111. The storage containers 106a and 106b are, for example, microtubes.

The control computer 204 of the microparticle filling device 200 executes the following operation according to the control program. Note that the operation of the microparticle filling device 200 is basically similar to that of the first embodiment (FIG. 4).

The control computer 204 receives a captured image of the camera system 107 via the image acquisition board 202, and confirms a position of the micro reaction vessel 12 to be charged based on the captured image.

The control computer 204 closes the valve 108 for atmospheric pressure relief using the control board 201, drives the drive system 102 and the dispensing system 105 to repeat suction and discharge of pure water at the nozzle 5 several times, and then repeats suction and discharge of 100% EtOH several times. By this operation, the inside of the nozzle 5 is cleaned.

The control computer 204 opens the valve 108 using the control board 201 and drives the drive system 102 to immerse the nozzle 5 in the storage container 106*a* of the microparticle suspension and to suck the microparticle suspension into the nozzle 5 using a capillary phenomenon.

The control computer 204 drives the drive system 102 using the control board 201 to move the micro reaction vessel 12 to be filled with the microparticles immediately below the nozzle 5 and to lower the nozzle 5 to a predetermined position (or raise the chip 11).

The control computer 204 receives, via the image acquisition board 202, a detection signal of an optical characteristic or an image of the tip of the nozzle 5 obtained by the optical system 103 to confirm settling of the microparticles and a height (volume or microparticle amount) of a high-concentration suspension.

After confirming that a predetermined amount of the high-concentration suspension has been formed, the control computer 204 sends an instruction to the control board 201 to drive the drive system 102 to lower the nozzle 5 (or raise the chip 11) until a change is observed in a numerical value of the sensor system 104. Specifically, the lowering of the nozzle 5 is started when the height of the high-concentration suspension reaches 95 μm.

The control computer 204 drives the drive system 102 using the control board 201, stops the nozzle 5 for two seconds after the tip of the nozzle 5 comes into contact with the bottom of the micro reaction vessel 12 (after the sensor system 104 senses the contact), and raises the nozzle 5 at a speed of 1 μm/s.

Figure 8:
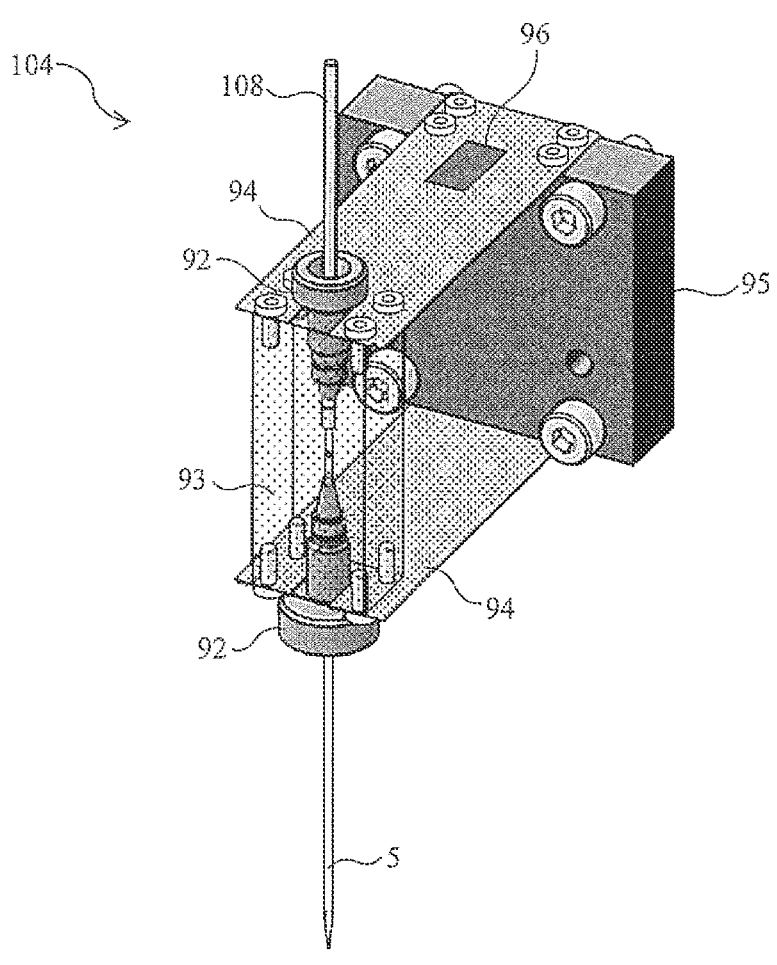
FIG. 8 is a perspective view illustrating a configuration of a sensor system.

FIG. 8 is a perspective view illustrating an example of a configuration of the sensor system 104. As illustrated in FIG. 8, the sensor system 104 includes two ferrules 92, a block 93, two leaf springs 94 (elastic bodies), a fixing jig 95, and a strain sensor 96.

The two ferrules 92 connect the nozzle 5 and the tube 109. The ferrules 92 are fixed to the block 93 (made of PMMA, for example).

First ends of the two leaf springs 94 in the longitudinal direction are screwed and fixed to the block 93. Second ends of the leaf springs 94 in the longitudinal direction are fixed to the fixing jig 95 made of metal. With such a configuration, when stress is applied to the nozzle 5, the stress is transmitted to the leaf springs 94 via the block 93, and the leaf springs 94 are deflected (deformed).

The strain sensor 96 is fixed to each of the leaf springs 94 along the surface of the leaf spring 94. When the tip of the nozzle 5 comes into contact with the bottom surface of the micro reaction vessel 12 and a force (stress) in the upward direction is applied to the nozzle 5, the leaf spring 94 is deflected. The strain sensor 96 detects the amount of the deflection. It can be determined that the nozzle 5 has come into contact with the micro reaction vessel 12 when the amount of deflection reaches a predetermined value or more.

<Single Cell Analysis Device>

Figure 9:
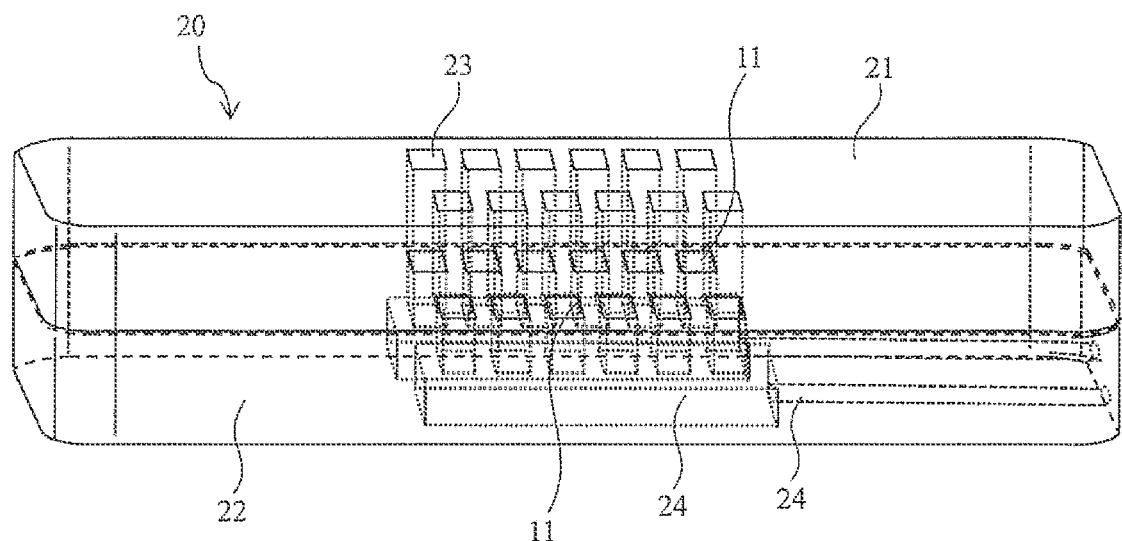
FIG. 9 is a schematic view of a flow cell device used is a single cell analysis device.

FIG. 9 is a schematic view of a flow cell device 20 used in the single cell analysis device. As illustrated in FIG. 9, the flow cell device 20 includes an upper plate 21 and a lower plate 22, which are made of resin (for example, PMMA). The chip 11 (see FIG. 6) is sandwiched and fixed between the upper plate 21 and the lower plate 22. The chip 11 incorporated in the flow cell device 20 is in a state in which the micro reaction vessel 12 is filled with the microparticles to which the DNA probes are immobilized using the above-described microparticle filling device 200. The chip 11 in this state may be referred to as a "vertical flow array chip (VFAC)".

In the example of FIG. 9, twelve chips 11 can be mounted on the flow cell device 20, but the number of the chips 11 can be selected arbitrarily.

The upper plate 21 is provided with wells 23 as many as the number of the chips 11. A cell sample, a cleaning liquid, an enzyme reagent, and the like can be supplied from the wells 23 to the chips 11. A bottom surface of the well 23 corresponds to an upper surface (surface on a side where the through-hole 14 is formed) of the chip 11. That is, when the chip 11 filled with the microparticles is used in the single cell analysis device, the vertical direction is the direction of FIG. 6(*b*). The through-hole 14 is provided in each of the micro reaction vessels 12, and a flow channel formed of the through-hole 14 and the micro reaction vessel 12 penetrates from the upper surface to a lower surface of the chip 11. The lower plate 22 is provided with a flow channel 24 leading from the micro reaction vessel 12 to the outside, and a suction pump (not illustrated) is connected to the flow channel 24. When a negative pressure is applied to the flow channel 24 by the suction pump, the reagent having been supplied from the well 23 and passed through the through-hole 14 and the micro reaction vessel 12 can be discharged.

The lower plate 22 configured to form the flow channel 24 can be formed by bonding a plurality of layers of plates. The upper plate 21 and the lower plate 22 can be processed by cutting.

<Implementation of Single Cell Analysis>

An experimental example in which single cell analysis is performed using a flow cell device will be described.

(Step1)

A cell solution in which about 70 to 100 cells were suspended in 1.0 μL, and 1 μL of a PBS buffer were added dropwise onto a chip using a manual pipette Thereafter, a negative pressure of 90 kPa or more was immediately applied to capture cells on the vertical flow array chip (VFAC). The capturing of cells is completed in one to two minutes. After confirming that the cell suspension has been completely sucked, 0.5 μL of a cell lysis buffer (100 mM Tris:HCl at pH 8.0 with 0.5 M NaCl, 10 mM EDTA, and 1% SDS) containing 1% SDS and 10% RNase OUT was added dropwise onto the chip while applying the negative pressure. The cells were crushed while sucking the lysis solution for one minute. Thereafter, 2.0 μL of a buffer having a high salt concentration (100 mM Tris:HCl at pH 8.0 with 0.5 M NaCl and 10 mM EDTA) was sucked for two minutes after dropping, and 2.0 μL of the same buffer was further sucked for two minutes after dropping so that the lysis buffer in the micro reaction vessel was cleaned. Thereafter, the pressure was returned to atmospheric pressure over two minutes in order to avoid deformation of the VFAC chip due to a rapid pressure change.

(Step2)

A reverse transcriptase solution was dispensed by 4.5 μL per chip. A flow cell and a 5 mL syringe were connected using a silicon tube. Suction was performed for eight seconds using a 1.7 cm spacer to guide a reagent into the micro reaction vessel. Then, a reverse transcription reaction was caused at 50° C. for fifty minutes. The amount of reverse transcriptase was substantially the same as the amount used for single cell analysis in the tube. The amount of the used reagent could be reduced by the number of cells that can be collected in one chip. Further, since one chip was subjected co the reaction processing in one tube in the proposed method, it was possible to reduce the labor for processing in inverse proportion to the number of cells that could be processed in one chip as compared with a plate-based method in which one cube was used for one cell.
(Step3)

Decomposition of mRNA hybridized to cDNA was performed so as not to inhibit the synthesis of the 2nd strand in the next step.
(Step4)

A primer corresponding to a gene to be measured (referred to as a gene-specific primer) was hybridized to the 1st strand cDNA to synthesize the 2nd strand cDNA.
(Step5)

PCR amplification was performed using a common primer. Then, selection and purification according to a base length of nucleic acids were performed using AMPure microparticles manufactured by Agencourt in order to remove a PCR product (non-specific amplification product) other than a target product at the time of amplification. A sample thus obtained was subjected to fragment analysis by 2100 Bioanalyzer and Agilent High Sensitivity DNA kit electrophoresis manufactured by Agilent to quantify the target product.
(Step6)

After purification with AMPure microparticles was performed, the target product was quantified by quantitative PCR, and its concentration was adjusted by dilution and evaporation and concentration to obtain a target product concentration of 2 nM. After denaturalization, the resultant was introduced into Illumina (registered trademark) and Miseq (registered trademark) to perform sequencing.

From sequencing data thus obtained, data was divided for each cell identification tag, and molecules before the PCR amplification were counted using molecule recognition tags, whereby single cell gene expression analysis data for each cell captured in the micro reaction vessel could be obtained.
<Technical Effect>

As described above, it has been presented in the second embodiment that the micro reaction vessel 12 formed in the chip 11 for single cell analysis can be filled with the microparticles to which the DNA probes are immobilized by adopting the same microparticle filling method as in the first embodiment. Each of the plurality of micro reaction vessels 12 can be filled with the microparticles at high density with high reproducibility. As a result, it is possible to obtain results of the single cell analysis for the large number of cells at the same time with high reproducibility, and thus it is possible to obtain the highly sensitive single cell analysis device.

Third Embodiment

In the first and second embodiments, the description has been given regarding the technique of concentrating the microparticle suspension in the nozzle by settling of the microparticles by gravity to acquire the high-concentration suspension, and filling the micro reaction vessel with the high-concentration suspension. On the other hand, proposed is a technique of forming a high-concentration suspension using a magnetic force in a third embodiment.

Figure 10:
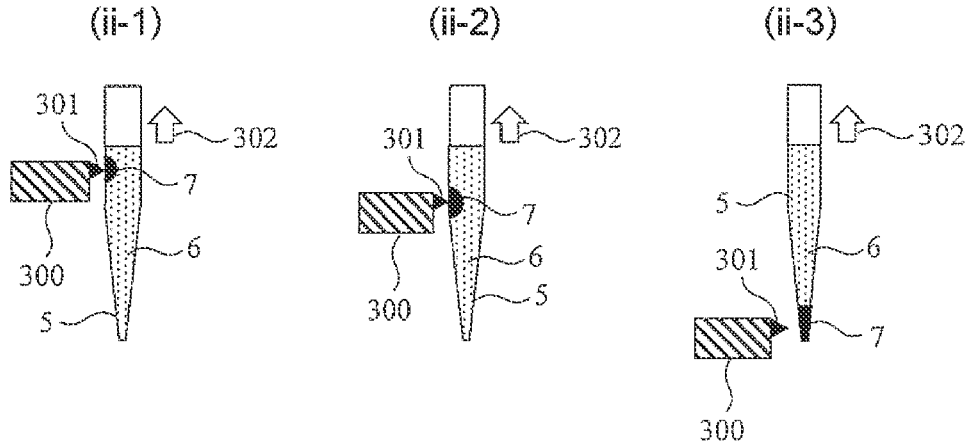
FIG. 10 is a schematic cross-sectional view for describing a microparticle filling method according to a third embodiment.

FIG. 10 is a schematic cross-sectional view for describing a microparticle filling method according to the third embodiment. In FIG. 10, step (ii) described in the first embodiment is illustrated by being subdivided into steps (ii-1) to (ii-3). This method uses a magnet 300 to which an iron cone 301 configured to concentrate magnetic field lines is attached. Further, magnetic microparticles are used as the microparticles in this method.

After the microparticle suspension 6 is sucked into the nozzle 5 to establish an initial state, the position of the nozzle 5 or the magnet 300 is controlled such that the magnet 300 is located on the top of the microparticle suspension 6 sucked into the nozzle 5 in step (ii-1). According to this operation, the microparticles collect near the magnet 300 so that the high-concentration suspension 7 is formed. The position of the magnet 300 is controlled by a drive system (not illustrated).

In step (ii-2), the nozzle 5 is moved relatively upward (in a direction of an arrow 302) with respect to the magnet 300 at a predetermined speed (1 μm/s or less) to lower a position of the high-concentration suspension 7 in the nozzle 5.

In step (ii-3), the movement of the magnet 300 is stopped when the high-concentration suspension 7 reaches a tip of the nozzle 5. According to this operation, a predetermined amount of the high-concentration suspension 7 can be formed at the tip of the nozzle 5.

When step (ii-3) is completed, the nozzle 5 can be lowered into the micro reaction vessel for filling of the microparticles in the same manner as in the first and second embodiments.

In step (ii-1), by arranging the magnet 300 close to an upper end interface of the microparticle suspension 6 and moving the magnet 300 to the position (ii-3) at an appropriate speed, it is possible to concentrate all the microparticles in the microparticle suspension 6 as the high-concentration suspension 7.

Figure 11:
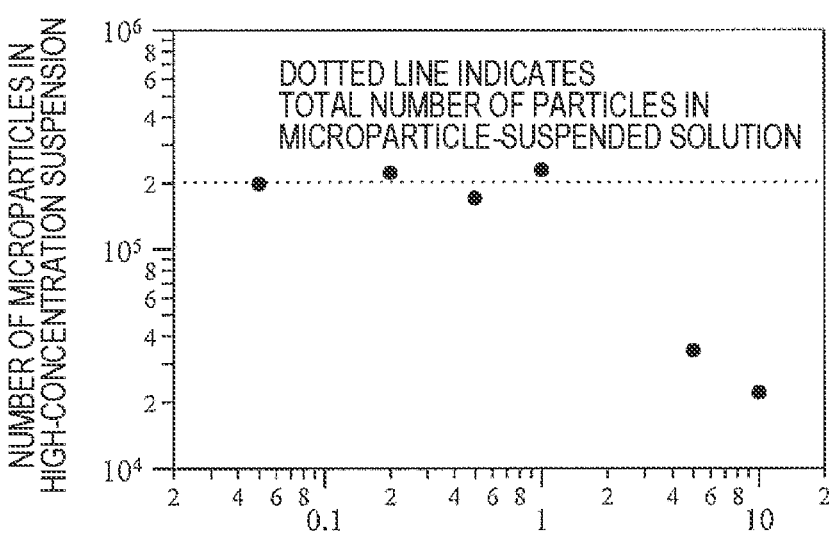
FIG. 11 is a graph illustrating a relationship between a pulling-up speed of a nozzle and the number of microparticles in a high-concentration suspension.

FIG. 11 is a graph illustrating a relationship between a pulling-up speed of the nozzle 5 and the number of microparticles in the high-concentration suspension 7. As illustrated in FIG. 11, it can be understood that a microparticle concentration is not sufficiently increased so that it is difficult to collect all the microparticles if the nozzle 5 is pulled up at a speed (relative speed) faster than 1 μm/s with respect to the magnet 300.

Further, even when the interface of the microparticle suspension is sufficiently separated (upward) from a position where the magnet 300 first approaches the nozzle 5, it is possible to control the amount of microparticles in the high-concentration suspension 7 by controlling the approaching speed of the magnet 300 to the nozzle 5.

In a case where a material having electric charge or dielectric characteristics is used as the microparticles, a mechanism for collecting the microparticles by applying an electric force to the nozzle 5 (for example, forming an electric field and the like) can be used instead of the magnet 300.
<Technical Effect>

As described above, the method of forming the high-concentration suspension using the magnetic force is adopted in the third embodiment. According to this, it is possible to shorten the time for forming the high-concentration suspension of the microparticles at the nozzle tip as compared with a case where microparticles in the nozzle are settled by gravity and concentrated.
[Modifications]

The present disclosure is not limited to the above-described embodiments and includes various modifications. For example, the above-described embodiments have been described in detail in order to describe the present disclosure in an easily understandable manner, and do not necessarily include the entire configuration that has been described above. Further, a part of a certain embodiment can be replaced with the configuration of another embodiment. Further, the configuration of one embodiment can be also added with the configuration of another embodiment. Further, a part of the configuration of each of the embodiments may be deleted or added or replaced with a part of the configuration of another embodiment.

REFERENCE SIGNS LIST

100, 200 microparticle filling device
1 planar substrate
2 micro reaction vessel
3a bottom surface of micro reaction vessel
3b sidewall surface of micro reaction vessel
4 through-hole
5 nozzle
6 microparticle suspension
7 high-concentration suspension
8 solution
9 outer wall of nozzle
11 chip

12 micro reaction vessel
14 through-bole
101 stage
102 drive system
103 optical system
104 sensor system
105 dispensing system
106 storage container
107 camera system
108 valve
109 tube
110 control system
201 control board
202 image acquisition board
203 AD conversion board
204 control computer
300 magnet
301 iron cone

The invention claimed is:

1. A microparticle filling method of filling at least one or more containers with microparticles, the microparticle filling comprising:

sucking a suspension of the microparticles into a nozzle;

concentrating the microparticles in the suspension to form a high-concentration suspension having a predetermined microparticle concentration at a tip of the nozzle;

bringing the high-concentration suspension in contact with an inner wall of the container;

separating, after the contact, the nozzle from the container to fill the container with the high-concentration suspension; and sensing the contact of the high-concentration suspension with the inner wall of the container based on stress applied to the nozzle.

2. The microparticle filling method according to claim 1, wherein an outer diameter of the nozzle is a size according to which the tip of the nozzle can reach a bottom surface of the container.

3. The microparticle filling method according to claim 1, further comprising determining that the microparticles in the high-concentration suspension have reached the predetermined microparticle concentration using a captured image of the nozzle or an optical characteristic of the nozzle.

4. The microparticle filling method according to claim 1, wherein a specific gravity of the microparticles is more than one, and the high-concentration suspension is formed at the tip of the nozzle by settling the microparticles by gravity.

5. A microparticle filling method of filling at least one or more containers with microparticles, the microparticle filling comprising:

sucking a suspension of the microparticles into a nozzle;

concentrating the microparticles in the suspension to form a high-concentration suspension having a predetermined microparticle concentration at a tip of the nozzle;

bringing the high-concentration suspension in contact with an inner wall of the container; and separating, after the contact, the nozzle from the container to fill the container with the high-concentration suspension, wherein the microparticles are magnetic microparticles, and the high-concentration suspension is formed by collecting the microparticles in the nozzle at the tip of the nozzle using a magnet.

6. The microparticle filling method according to claim 1, wherein the container is a micro reaction vessel formed in a chip for single cell analysis, and the micro reaction vessel has a through-bole at a bottom.

7. The microparticle filling method according to claim 1, wherein the predetermined microparticle concentration is a concentration at which a number of the microparticles per unit volume is 50% or more of a maximum packing density.

8. The microparticle filling method according to claim 5, wherein an outer diameter of the nozzle is a size according to which the tip of the nozzle can reach a bottom surface of the container.

9. The microparticle filling method according to claim 5, further comprising determining that the microparticles in the high-concentration suspension have reached the predetermined microparticle concentration using a captured image of the nozzle or an optical characteristic of the nozzle.

10. The microparticle filling method according to claim 5, wherein a specific gravity of the microparticles is more than one, and the high-concentration suspension is formed at the tip of the nozzle by settling the microparticles by gravity.

11. The microparticle filling method according to claim 5, wherein the container is a micro reaction vessel formed in a chip for single cell analysis, and the micro reaction vessel has a through-bole at a bottom.

12. The microparticle filling method according to claim 5, wherein the predetermined microparticle concentration is a concentration at which a number of the microparticles per unit volume is 50% or more of a maximum packing density.

* * * * *

SEQUENCE LISTING

```
<160> NUMBER OF SEQ ID NOS: 100

<210> SEQ ID NO 1
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 1
ccatctcatc cctgcgtgtc tccgactcag tcgcgtannn nnnntttttt tttttttttt      60 ttvn                                                                  64

<210> SEQ ID NO 2
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 2
ccatctcatc cctgcgtgtc tccgactcag tatcgcgnnn nnnntttttt tttttttttt      60 ttvn                                                                  64

<210> SEQ ID NO 3
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
```

-continued

```
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 3
ccatctcatc cctgcgtgtc tccgactcag cgcgatannn nnnntttttt tttttttttt      60 ttvn                                                                  64

<210> SEQ ID NO 4
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 4
ccatctcatc cctgcgtgtc tccgactcag atacgcgnnn nnnntttttt tttttttttt      60 ttvn                                                                  64

<210> SEQ ID NO 5
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 5
ccatctcatc cctgcgtgtc tccgactcag tcgtacgnnn nnnntttttt tttttttttt      60 ttvn                                                                  64

<210> SEQ ID NO 6
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 6
ccatctcatc cctgcgtgtc tccgactcag acgcgtannn nnnntttttt tttttttttt      60 ttvn                                                                  64
```

-continued

```
<210> SEQ ID NO 7
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 7
ccatctcatc cctgcgtgtc tccgactcag tcgatcgnnn nnnntttttt tttttttttt      60 ttvn                                                                  64

<210> SEQ ID NO 8
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 8
ccatctcatc cctgcgtgtc tccgactcag acgatcgnnn nnnntttttt tttttttttt      60 ttvn                                                                  64

<210> SEQ ID NO 9
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 9
ccatctcatc cctgcgtgtc tccgactcag acgtacgnnn nnnntttttt tttttttttt      60 ttvn                                                                  64

<210> SEQ ID NO 10
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
```

<223> OTHER INFORMATION: n is a, c, g, or t

<400> SEQUENCE: 10
ccatctcatc cctgcgtgtc tccgactcag cgatacgnnn nnnntttttt tttttttttt      60 ttvn                                                                   64

<210> SEQ ID NO 11
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 11
ccatctcatc cctgcgtgtc tccgactcag cgtatcgnnn nnnntttttt tttttttttt      60 ttvn                                                                   64

<210> SEQ ID NO 12
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 12
ccatctcatc cctgcgtgtc tccgactcag cgtacgcnnn nnnntttttt tttttttttt      60 ttvn                                                                   64

<210> SEQ ID NO 13
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 13
ccatctcatc cctgcgtgtc tccgactcag gcgtacgnnn nnnntttttt tttttttttt      60 ttvn                                                                   64

<210> SEQ ID NO 14
<211> LENGTH: 64
<212> TYPE: DNA
<213> ORGANISM: Artificial

```
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 14
ccatctcatc cctgcgtgtc tccgactcag tacgtcgnnn nnnntttttt tttttttttt     60 ttvn                                                                  64

<210> SEQ ID NO 15
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 15
ccatctcatc cctgcgtgtc tccgactcag cgacgtannn nnnntttttt tttttttttt     60 ttvn                                                                  64

<210> SEQ ID NO 16
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 16
ccatctcatc cctgcgtgtc tccgactcag cgcgctannn nnnntttttt tttttttttt     60 ttvn                                                                  64

<210> SEQ ID NO 17
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 17
```

-continued

```
ccatctcatc cctgcgtgtc tccgactcag tagcgcgnnn nnnntttttt tttttttttt      60 ttvn                                                                   64

<210> SEQ ID NO 18
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 18
ccatctcatc cctgcgtgtc tccgactcag actagcgnnn nnnntttttt tttttttttt      60 ttvn                                                                   64

<210> SEQ ID NO 19
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 19
ccatctcatc cctgcgtgtc tccgactcag cgatcgcnnn nnnntttttt tttttttttt      60 ttvn                                                                   64

<210> SEQ ID NO 20
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 20
ccatctcatc cctgcgtgtc tccgactcag gcgatcgnnn nnnntttttt tttttttttt      60 ttvn                                                                   64

<210> SEQ ID NO 21
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
```

-continued

```
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 21
ccatctcatc cctgcgtgtc tccgactcag gtacgcgnnn nnnntttttt tttttttttt    60 ttvn                                                                 64

<210> SEQ ID NO 22
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 22
ccatctcatc cctgcgtgtc tccgactcag tacgcgcnnn nnnntttttt tttttttttt    60 ttvn                                                                 64

<210> SEQ ID NO 23
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 23
ccatctcatc cctgcgtgtc tccgactcag gcgcgtannn nnnntttttt tttttttttt    60 ttvn                                                                 64

<210> SEQ ID NO 24
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 24
ccatctcatc cctgcgtgtc tccgactcag tatgcgcnnn nnnntttttt tttttttttt    60 ttvn                                                                 64
```

```
<210> SEQ ID NO 25
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 25
ccatctcatc cctgcgtgtc tccgactcag gcgcatannn nnnntttttt tttttttttt        60 ttvn                                                                     64

<210> SEQ ID NO 26
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 26
ccatctcatc cctgcgtgtc tccgactcag ctagtcgnnn nnnntttttt tttttttttt        60 ttvn                                                                     64

<210> SEQ ID NO 27
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 27
ccatctcatc cctgcgtgtc tccgactcag gtcgacgnnn nnnntttttt tttttttttt        60 ttvn                                                                     64

<210> SEQ ID NO 28
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
```

```
<222> LOCATION: (64)..(64)
<223> OTHER INFORMATION: n is a, c, g, or t

<400> SEQUENCE: 28
ccatctcatc cctgcgtgtc tccgactcag tagtgcgnnn nnnntttttt tttttttttt      60 ttvn                                                                  64

<210> SEQ ID NO 29
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 29
ccatctcatc cctgcgtgtc tccgactcag cgcactannn nnnntttttt tttttttttt      60 ttvn                                                                  64

<210> SEQ ID NO 30
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 30
ccatctcatc cctgcgtgtc tccgactcag tacgacgnnn nnnntttttt tttttttttt      60 ttvn                                                                  64

<210> SEQ ID NO 31
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 31
ccatctcatc cctgcgtgtc tccgactcag cgtcgtannn nnnntttttt tttttttttt      60 ttvn                                                                  64

<210> SEQ ID NO 32
<211> LENGTH: 64
<212> TYPE: DNA
```

```
ccatctcatc cctgcgtgtc tccgactcag gtatgcgnnn nnnntttttt tttttttttt     60 ttvn                                                                  64

<210> SEQ ID NO 36
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 36
ccatctcatc cctgcgtgtc tccgactcag atcgtcgnnn nnnntttttt tttttttttt     60 ttvn                                                                  64

<210> SEQ ID NO 37
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 37
ccatctcatc cctgcgtgtc tccgactcag gtcgctannn nnnntttttt tttttttttt     60 ttvn                                                                  64

<210> SEQ ID NO 38
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 38
ccatctcatc cctgcgtgtc tccgactcag ctacgcgnnn nnnntttttt tttttttttt     60 ttvn                                                                  64

<210> SEQ ID NO 39
<211> LENGTH: 64
<212> TYPE: DNA
<213> ORGANISM: Artificial
<220> FEATURE:
<223> OTHER INFORMATION: probe
<220> FEATURE:
```

```
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 39
ccatctcatc cctgcgtgtc tccgactcag gatacgcnnn nnnntttttt tttttttttt       60 ttvn                                                                    64

<210> SEQ ID NO 40
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 40
ccatctcatc cctgcgtgtc tccgactcag gctagcgnnn nnnntttttt tttttttttt       60 ttvn                                                                    64

<210> SEQ ID NO 41
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 41
ccatctcatc cctgcgtgtc tccgactcag cgctagcnnn nnnntttttt tttttttttt       60 ttvn                                                                    64

<210> SEQ ID NO 42
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 42
ccatctcatc cctgcgtgtc tccgactcag tagtcgcnnn nnnntttttt tttttttttt       60 ttvn                                                                    64
```

-continued

```
<210> SEQ ID NO 43
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 43
ccatctcatc cctgcgtgtc tccgactcag gcgactannn nnnntttttt ttttttttttt      60 ttvn                                                                    64

<210> SEQ ID NO 44
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 44
ccatctcatc cctgcgtgtc tccgactcag gtgcgtannn nnnntttttt ttttttttttt      60 ttvn                                                                    64

<210> SEQ ID NO 45
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 45
ccatctcatc cctgcgtgtc tccgactcag atcgacgnnn nnnntttttt ttttttttttt      60 ttvn                                                                    64

<210> SEQ ID NO 46
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
```

-continued

```
<221> NAME/KEY: misc_feature
<222> LOCATION: (64)..(64)
<223> OTHER INFORMATION: n is a, c, g, or t

<400> SEQUENCE: 46
ccatctcatc cctgcgtgtc tccgactcag ctagcgcnnn nnnntttttt tttttttttt      60 ttvn                                                                  64

<210> SEQ ID NO 47
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 47
ccatctcatc cctgcgtgtc tccgactcag gagcgtannn nnnntttttt tttttttttt      60 ttvn                                                                  64

<210> SEQ ID NO 48
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 48
ccatctcatc cctgcgtgtc tccgactcag ctatcgcnnn nnnntttttt tttttttttt      60 ttvn                                                                  64

<210> SEQ ID NO 49
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 49
ccatctcatc cctgcgtgtc tccgactcag cgatagcnnn nnnntttttt tttttttttt      60 ttvn                                                                  64

<210> SEQ ID NO 50
<211> LENGTH: 64
```

```
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 50
ccatctcatc cctgcgtgtc tccgactcag gctatcgnnn nnnntttttt tttttttttt       60 ttvn                                                                   64

<210> SEQ ID NO 51
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 51
ccatctcatc cctgcgtgtc tccgactcag gtatcgcnnn nnnntttttt tttttttttt       60 ttvn                                                                   64

<210> SEQ ID NO 52
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 52
ccatctcatc cctgcgtgtc tccgactcag atgcgcgnnn nnnntttttt tttttttttt       60 ttvn                                                                   64

<210> SEQ ID NO 53
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t
```

-continued

```
<400> SEQUENCE: 53
ccatctcatc cctgcgtgtc tccgactcag tcgacgcnnn nnnntttttt tttttttttt    60 ttvn                                                                64

<210> SEQ ID NO 54
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 54
ccatctcatc cctgcgtgtc tccgactcag tgtcgcgnnn nnnntttttt tttttttttt    60 ttvn                                                                64

<210> SEQ ID NO 55
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 55
ccatctcatc cctgcgtgtc tccgactcag gacgctannn nnnntttttt tttttttttt    60 ttvn                                                                64

<210> SEQ ID NO 56
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 56
ccatctcatc cctgcgtgtc tccgactcag cgtagcgnnn nnnntttttt tttttttttt    60 ttvn                                                                64

<210> SEQ ID NO 57
<211> LENGTH: 64
<212> TYPE: DNA
<213> ORGANISM: Artificial
<220> FEATURE:
<223> OTHER INFORMATION: probe
```

```
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 57
ccatctcatc cctgcgtgtc tccgactcag cgctacgnnn nnnntttttt tttttttttt      60 ttvn                                                                  64

<210> SEQ ID NO 58
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 58
ccatctcatc cctgcgtgtc tccgactcag ctagacgnnn nnnntttttt tttttttttt      60 ttvn                                                                  64

<210> SEQ ID NO 59
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 59
ccatctcatc cctgcgtgtc tccgactcag ctatgcgnnn nnnntttttt tttttttttt      60 ttvn                                                                  64

<210> SEQ ID NO 60
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 60
ccatctcatc cctgcgtgtc tccgactcag agtcgcgnnn nnnntttttt tttttttttt      60
```

```
ttvn                                                                  64

<210> SEQ ID NO 61
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 61
ccatctcatc cctgcgtgtc tccgactcag cgtatgcnnn nnnntttttt tttttttttt     60 ttvn                                                                  64

<210> SEQ ID NO 62
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 62
ccatctcatc cctgcgtgtc tccgactcag gcatacgnnn nnnntttttt tttttttttt     60 ttvn                                                                  64

<210> SEQ ID NO 63
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 63
ccatctcatc cctgcgtgtc tccgactcag tcgcgcgnnn nnnntttttt tttttttttt     60 ttvn                                                                  64

<210> SEQ ID NO 64
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
```

-continued

```
<220> FEATURE:
<221> NAME/KEY: misc_feature
<222> LOCATION: (64)..(64)
<223> OTHER INFORMATION: n is a, c, g, or t

<400> SEQUENCE: 64
ccatctcatc cctgcgtgtc tccgactcag catacgcnnn nnnntttttt tttttttttt      60 ttvn                                                                   64

<210> SEQ ID NO 65
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 65
ccatctcatc cctgcgtgtc tccgactcag agtacgcnnn nnnntttttt tttttttttt      60 ttvn                                                                   64

<210> SEQ ID NO 66
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 66
ccatctcatc cctgcgtgtc tccgactcag tcacgcgnnn nnnntttttt tttttttttt      60 ttvn                                                                   64

<210> SEQ ID NO 67
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 67
ccatctcatc cctgcgtgtc tccgactcag actacgcnnn nnnntttttt tttttttttt      60 ttvn                                                                   64

<210> SEQ ID NO 68
```

```
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 68
ccatctcatc cctgcgtgtc tccgactcag atagcgcnnn nnnntttttt tttttttttt      60 ttvn                                                                  64

<210> SEQ ID NO 69
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 69
ccatctcatc cctgcgtgtc tccgactcag tagcacgnnn nnnntttttt tttttttttt      60 ttvn                                                                  64

<210> SEQ ID NO 70
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 70
ccatctcatc cctgcgtgtc tccgactcag cgtgctannn nnnntttttt tttttttttt      60 ttvn                                                                  64

<210> SEQ ID NO 71
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t
```

-continued

```
<400> SEQUENCE: 71
ccatctcatc cctgcgtgtc tccgactcag cacgctannn nnnntttttt tttttttttt      60 ttvn                                                                    64

<210> SEQ ID NO 72
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 72
ccatctcatc cctgcgtgtc tccgactcag gatagcgnnn nnnntttttt tttttttttt      60 ttvn                                                                    64

<210> SEQ ID NO 73
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 73
ccatctcatc cctgcgtgtc tccgactcag acgctcgnnn nnnntttttt tttttttttt      60 ttvn                                                                    64

<210> SEQ ID NO 74
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 74
ccatctcatc cctgcgtgtc tccgactcag tcgtgcgnnn nnnntttttt tttttttttt      60 ttvn                                                                    64

<210> SEQ ID NO 75
<211> LENGTH: 64
<212> TYPE: DNA
<213> ORGANISM: Artificial
<220> FEATURE:
```

```
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 75
ccatctcatc cctgcgtgtc tccgactcag actcgcgnnn nnnntttttt tttttttttt     60 ttvn                                                                  64

<210> SEQ ID NO 76
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 76
ccatctcatc cctgcgtgtc tccgactcag agcgctannn nnnntttttt tttttttttt     60 ttvn                                                                  64

<210> SEQ ID NO 77
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 77
ccatctcatc cctgcgtgtc tccgactcag tgacgcgnnn nnnntttttt tttttttttt     60 ttvn                                                                  64

<210> SEQ ID NO 78
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 78
ccatctcatc cctgcgtgtc tccgactcag tgcgtcgnnn nnnntttttt tttttttttt     60
```

```
ttvn                                                              64

<210> SEQ ID NO 79
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 79
ccatctcatc cctgcgtgtc tccgactcag ctcgctannn nnnntttttt tttttttttt      60 ttvn                                                              64

<210> SEQ ID NO 80
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 80
ccatctcatc cctgcgtgtc tccgactcag tgcgctannn nnnntttttt tttttttttt      60 ttvn                                                              64

<210> SEQ ID NO 81
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 81
ccatctcatc cctgcgtgtc tccgactcag tagacgcnnn nnnntttttt tttttttttt      60 ttvn                                                              64

<210> SEQ ID NO 82
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
```

```
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 82
ccatctcatc cctgcgtgtc tccgactcag gcgtctannn nnnntttttt tttttttttt      60 ttvn                                                                   64

<210> SEQ ID NO 83
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 83
ccatctcatc cctgcgtgtc tccgactcag tagctcgnnn nnnntttttt tttttttttt      60 ttvn                                                                   64

<210> SEQ ID NO 84
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 84
ccatctcatc cctgcgtgtc tccgactcag cgagctannn nnnntttttt tttttttttt      60 ttvn                                                                   64

<210> SEQ ID NO 85
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 85
ccatctcatc cctgcgtgtc tccgactcag ctcgacgnnn nnnntttttt tttttttttt      60 ttvn                                                                   64
```

```
<210> SEQ ID NO 86
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 86
ccatctcatc cctgcgtgtc tccgactcag tgtacgcnnn nnnntttttt tttttttttt     60 ttvn                                                                 64

<210> SEQ ID NO 87
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 87
ccatctcatc cctgcgtgtc tccgactcag tgcgacgnnn nnnntttttt tttttttttt     60 ttvn                                                                 64

<210> SEQ ID NO 88
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 88
ccatctcatc cctgcgtgtc tccgactcag tcgagcgnnn nnnntttttt tttttttttt     60 ttvn                                                                 64

<210> SEQ ID NO 89
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
```

-continued

```
<223> OTHER INFORMATION: n is a, c, g, or t

<400> SEQUENCE: 89
ccatctcatc cctgcgtgtc tccgactcag cgcgacgnnn nnnntttttt tttttttttt      60 ttvn                                                                  64

<210> SEQ ID NO 90
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 90
ccatctcatc cctgcgtgtc tccgactcag cgtcgcgnnn nnnntttttt tttttttttt      60 ttvn                                                                  64

<210> SEQ ID NO 91
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 91
ccatctcatc cctgcgtgtc tccgactcag acgcacgnnn nnnntttttt tttttttttt      60 ttvn                                                                  64

<210> SEQ ID NO 92
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 92
ccatctcatc cctgcgtgtc tccgactcag cgacgcgnnn nnnntttttt tttttttttt      60 ttvn                                                                  64

<210> SEQ ID NO 93
<211> LENGTH: 64
<212> TYPE: DNA
<213> ORGANISM: Artificial
```

<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 93
ccatctcatc cctgcgtgtc tccgactcag cgcgtcgnnn nnnntttttt tttttttttt      60 ttvn                                                                   64

<210> SEQ ID NO 94
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 94
ccatctcatc cctgcgtgtc tccgactcag acgacgcnnn nnnntttttt tttttttttt      60 ttvn                                                                   64

<210> SEQ ID NO 95
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 95
ccatctcatc cctgcgtgtc tccgactcag atcgcgcnnn nnnntttttt tttttttttt      60 ttvn                                                                   64

<210> SEQ ID NO 96
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 96

-continued

```
ccatctcatc cctgcgtgtc tccgactcag gatcgcgnnn nnnntttttt tttttttttt      60 ttvn                                                                   64

<210> SEQ ID NO 97
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 97
ccatctcatc cctgcgtgtc tccgactcag acacgcgnnn nnnntttttt tttttttttt      60 ttvn                                                                   64

<210> SEQ ID NO 98
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 98
ccatctcatc cctgcgtgtc tccgactcag acgcgcgnnn nnnntttttt tttttttttt      60 ttvn                                                                   64

<210> SEQ ID NO 99
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 99
ccatctcatc cctgcgtgtc tccgactcag cgtgtcgnnn nnnntttttt tttttttttt      60 ttvn                                                                   64

<210> SEQ ID NO 100
<211> LENGTH: 64
<212> TYPE: DNA
<213> ORGANISM: Artificial
<220> FEATURE:
<223> OTHER INFORMATION: probe
<220> FEATURE:
<221> NAME/KEY: misc_feature
```

-continued

```
<222> LOCATION: (38)..(44)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 100
ccatctcatc cctgcgtgtc tccgactcag cgtgacgnnn nnnntttttt tttttttttt      60 ttvn                                                                   64
```